United States Patent [19]

Becker et al.

[11] Patent Number: 4,932,280
[45] Date of Patent: Jun. 12, 1990

[54] COAXIAL DRIVE SHAFT SYSTEM WITH SHEARABLE SECTION

[75] Inventors: Thomas Becker; Daniel M. Ryan, both of Rockford, Ill.

[73] Assignee: Sundstrand Corporation, Rockford, Ill.

[21] Appl. No.: 266,645

[22] Filed: Nov. 3, 1988

[51] Int. Cl.$^5$ .................. F16H 37/06; F16D 9/00
[52] U.S. Cl. .................. 74/665 G; 74/665 F; 464/32; 464/183
[58] Field of Search ......... 74/665 F, 665 G, 665 GA, 74/665 GB; 464/32, 33, 162, 183

[56] References Cited

U.S. PATENT DOCUMENTS

| | | | |
|---|---|---|---|
| 2,524,853 | 10/1950 | Szekely | 464/162 X |
| 2,773,369 | 12/1956 | Klemm | 464/32 |
| 2,941,473 | 5/1955 | Lorenz | 464/32 |
| 3,124,361 | 3/1964 | Haberland et al. | 464/33 X |
| 4,218,896 | 8/1980 | van der Lely | 64/28 R |
| 4,248,105 | 2/1981 | Downing et al. | 74/710.5 |
| 4,273,006 | 6/1981 | Woodbury | 74/710.5 |
| 4,354,850 | 10/1982 | Piepenbreier et al. | 464/32 |
| 4,392,835 | 7/1983 | Siddiqui et al. | 464/32 |
| 4,452,095 | 6/1984 | Roy et al. | 464/32 X |
| 4,543,074 | 9/1985 | Ville et al. | 464/33 |
| 4,669,999 | 6/1987 | Miller | 464/32 X |
| 4,753,130 | 6/1988 | Rode | 74/665 GX |

FOREIGN PATENT DOCUMENTS

| | | | |
|---|---|---|---|
| 129978 | 1/1929 | Fed. Rep. of Germany | 464/33 |
| 69805 | 7/1930 | Fed. Rep. of Germany | 464/33 |

*Primary Examiner*—Dwight G. Diehl
*Assistant Examiner*—Chris Campbell
*Attorney, Agent, or Firm*—Wood, Dalton, Phillips Mason & Rowe

[57] ABSTRACT

A coaxial drive shaft system is provided with an overload shearable coupling for driving multiple outputs from a single input. A pair of coaxial, telescoped drive shafts are provided as independent outputs to a pair of driven devices. A singular input shaft is coupled to the drive shafts by a gearbox for simultaneously rotating the drive shafts. A shear section is formed in one of the drive shafts for rupturing the one drive shaft in response to an overload condition thereon, while the other coaxial, telescoped drive shaft continues to be rotated by the singular input shaft.

12 Claims, 1 Drawing Sheet

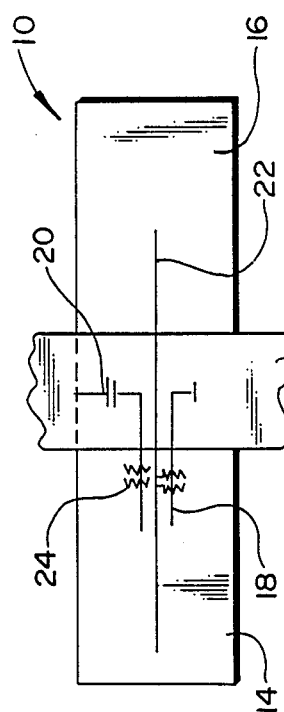
FIG. I
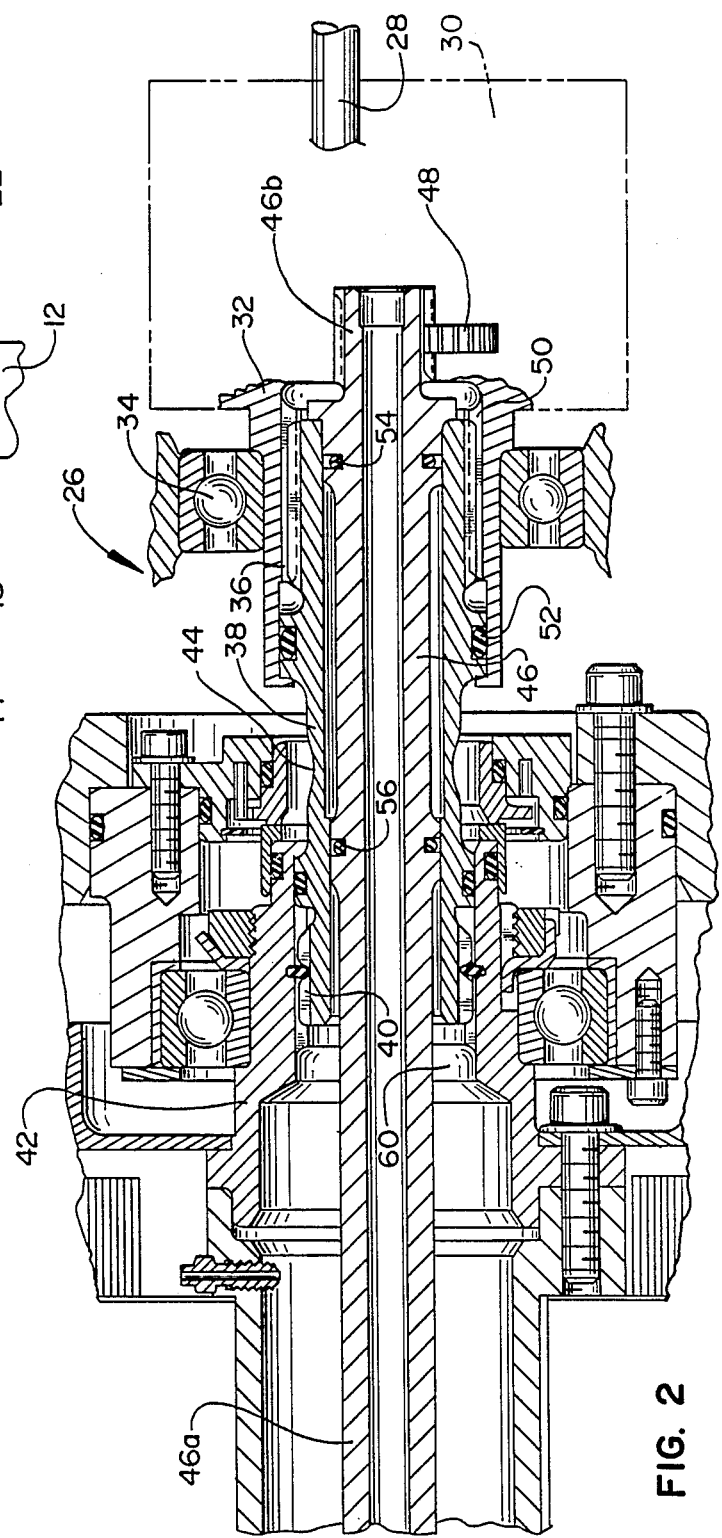
FIG. 2

COAXIAL DRIVE SHAFT SYSTEM WITH SHEARABLE SECTION

FIELD OF THE INVENTION

This invention generally relates to drive shaft systems and, particularly, to a coaxial drive shaft system with an overload shearable coupling.

BACKGROUND OF THE INVENTION

In certain drive shaft systems, it is desirable to have a single input shaft used to drive two output devices through a pair of drive shafts. For instance, applications arise where it is beneficial to drive two rotating accessories from a common gearbox pad. Such situations often arise in aircraft applications. A single input shaft, through a gearbox, might be used to rotate two output shafts independently coupled to a blower and the rotor of a generator.

In applications of the character described, it often is desirable and sometimes necessary to design the rotating shafts such that failure of one shaft does not affect the operation of the second shaft. This can be accomplished through a shear section in the one shaft.

Of course, in aircraft applications, space requirements are absolutely critical. This includes both axial as well as diametral space limitations. Shear sections or frangible elements of drive shaft systems are known, for instance, in U.S. Pat. No. 2,941,473 to Lorenz, dated June 21, 1960. In this patent, a single drive shaft operates a plurality of pumps located axially of the shaft. The pumps simply are arranged at axial locations and coupled to the shaft by frangible coupling members. Any number of pump units can be so driven simply by extending the length of the shaft. In such applications as aircraft applications, such liberal use of axial dimensions is not possible.

This invention is directed to a new and improved coaxial drive shaft structure with a shear section, using telescoped drive shafts to provide an efficient and compact device.

SUMMARY OF THE INVENTION

An object, therefore, of the invention is to provide a new and improved coaxial drive shaft system with an overload shearable coupling for driving multiple outputs from a single input.

More particularly, a pair of coaxial, telescoped drive shafts provide independent outputs to a pair of driven means. Singular input means are coupled to the drive shafts for simultaneously rotating the drive shafts. A shear section is formed in one of the drive shafts for rupturing the one drive shaft as a result of an overload condition thereon while the other coaxial, telescoped drive shaft continues to be rotated by the singular input means.

In the exemplary embodiment of the invention, the one drive shaft is telescoped over the other drive shaft and includes the shear section intermediate opposite ends thereof. The other drive shaft extends beyond one end of the one drive shaft for connection to its respective driven means.

The singular input means is shown herein to include a single input shaft coupled to both the output drive shafts by gear means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a block diagram of a coaxial shaft arrangement with a shear section, according to known prior art; and FIG. 2 is an axial section through a coaxial drive shaft system according to the invention.

DETAILED DESCRIPTION OF THE PREFERRED EMBODIMENT

Referring to the drawings in greater detail, and first to FIG. 1, a prior art coaxial shaft arrangement, generally designated 10, is shown in block-diagram form and represents a known construction made by the assignee of this invention.

The system of FIG. 1 includes a gearbox 12 located between a constant speed drive 14 and a generator 16. A cylindrical shaft 18 of constant speed drive 14 is rotated by appropriate gears 20 in the gearbox. Torque is provided to generator 16 through a shaft 22 telescoped within and driven by cylindrical shaft 18. The cylindrical shaft is provided with a shear section 24. Should an overload condition occur on cylindrical shaft 18 to constant speed drive 14, shear section 24 will break. However, this will also break the drive connection to inner coaxial shaft 22 and undesirably shut down generator 16. In other words, although a compact unit is provided, no provision is made for continued operation of the one driven means should the drive connection to the other driven means be broken.

FIG. 2 shows a coaxial drive shaft system, generally designated 26, with an overload shearable coupling for driving multiple outputs from a single input, according to the invention.

More particularly, a single input shaft 28 is rotatably coupled to a gearbox 30. A gearbox shaft 32 is supported by appropriate bearings 34 and is connected, as by a spline 36, to a cylindrical drive shaft 38. The cylindrical drive shaft is splined, as at 40, to an accessory drive shaft 42, such as part of a rotor of a generator. Cylindrical drive shaft 38 has a shear section 44 which is frangible in response to an overload condition thereon.

A second, coaxial drive shaft 46 is telescoped within cylindrical drive shaft 38 and extends beyond the distal end of the cylindrical drive shaft, as at 46a, for connection to another accessory, such as a blower of an aircraft. Inner coaxial drive shaft 46 is connected, at its opposite end 46b, to appropriate gearing 48 within gearbox 30.

Lubricant for spline connection 36 is provided from gearbox 30, as at 50. Shaft seals 52 and 54 seal the lubricant to the area of the spline connection. A shaft seal 56 is provided between the outside diameter of drive shaft 46 and the inside diameter of cylindrical shaft 36.

From the foregoing, it can be seen that a single input shaft 28, through gearbox 30, drives both the outer cylindrical drive shaft 38, through gearbox shaft 32, and the inner telescoped drive shaft 46, through gearing 48. These drives can be of constant or differential rotational speeds. Should an overload condition occur on cylindrical drive shaft 38, shear section 44 will break to prevent damage to the gearbox and other components up the line from the drive shaft system. However, the driving connection to inner coaxial shaft 46 remains undisturbed and can continue to drive its respective accessory, such as the blower of the aircraft. Shaft seal 56 between drive shafts 38 and 46 prevents oil leakage from cavity 60 should shear section 44 break.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A coaxial drive shaft system with an overload shearable coupling for driving multiple outputs from a single input, comprising:
    a pair of coaxial, telescoped drive shafts for providing independent outputs to a pair of driven means;
    singular input means drivingly connected independently to both the drive shafts for simultaneously rotating the drive shafts at different speeds; and
    a shear section formed on one of the drive shafts for rupturing the one drive shaft in response to an overload condition thereon while the other coaxial, telescoped drive shaft continues to be rotated by the singular input means.

2. The coaxial drive shaft system of claim 1 wherein said one drive shaft is telescoped over the other drive shaft and includes said shear section intermediate opposite ends thereof.

3. The coaxial drive shaft system of claim 2 wherein said other drive shaft extends beyond one end of the one drive shaft for connection to its respective driven means.

4. The coaxial drive shaft system of claim 1 wherein said singular input means include a single input shaft drivingly connected to both said drive shafts.

5. The coaxial drive shaft system of claim 4, including gear means coupling said input shaft to the drive shafts.

6. A coaxial drive shaft system with an overload shearable coupling for driving multiple outputs from a single input, comprising:
    a single input shaft;
    gear means connected to the input shaft; and
    first and second coaxial, telescoped drive shafts for providing independent outputs at different speeds to a pair of driven means,
    the first drive shaft having one end connected to the gear means, an opposite end for coupling to one of the driven means and a shear section integral with the drive shaft between said ends,
    the second drive shaft extending axially through the first drive shaft and having one end connected to the gear means and an opposite end for coupling to the other of the driven means,
    whereby a rupture of the shear section of the first drive shaft due to an overload condition thereon allows the second drive shaft to continue to be driven by the single input shaft.

7. The coaxial drive shaft system of claim 6 wherein said opposite end of the second drive shaft extends beyond the opposite end of the first drive shaft.

8. In a drive shaft system which includes a single input shaft for driving plural outputs, a drive shaft means comprising:
    a pair of coaxial, telescoped drive shafts both drivingly connected independently to said single input shaft for providing independent outputs at different speeds to a pair of driven means; and
    a shear action formed on one of the drive shafts for rupturing the one drive shaft in response to an overload condition thereon while the other coaxial, telescoped drive shaft continues to be rotated by the single input shaft.

9. In a drive shaft system as set forth in claim 8, wherein said one drive shaft is telescoped over the other drive shaft and includes said shear section intermediate opposite ends thereof.

10. In a drive shaft system as set forth in claim 9, wherein said other drive shaft extends beyond one end of the one drive shaft for connection to its respective driven means.

11. In a drive shaft system as set forth in claim 8, wherein said single input shaft include a single input shaft drivingly connected to both said drive shafts.

12. In a drive shaft system as set forth in claim 11, including gear means coupling said input shaft to the drive shafts.

* * * * *